(12) United States Patent
Ulrich et al.

(10) Patent No.: US 10,864,987 B2
(45) Date of Patent: Dec. 15, 2020

(54) COUNTER ROTATING TORQUE DRIVE FOR ROTARY WING VEHICLE PROPULSION

(71) Applicant: The Aerospace Corporation, El Segundo, CA (US)

(72) Inventors: Evan Robert Ulrich, Hermosa Beach, CA (US); Robert Edward Oberto, Manhattan Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 614 days.

(21) Appl. No.: 15/724,526

(22) Filed: Oct. 4, 2017

(65) Prior Publication Data

US 2019/0100302 A1 Apr. 4, 2019

(51) Int. Cl.
*B64C 27/82* (2006.01)
*B64C 27/78* (2006.01)
*B64C 27/10* (2006.01)

(52) U.S. Cl.
CPC .............. *B64C 27/82* (2013.01); *B64C 27/10* (2013.01); *B64C 27/78* (2013.01); *B64C 2027/8272* (2013.01)

(58) Field of Classification Search
CPC . B64C 27/82; B64C 2027/8272; B64C 27/78; B64C 27/10
See application file for complete search history.

(56) References Cited

U.S. PATENT DOCUMENTS

| | | | | |
|---|---|---|---|---|
| 2,364,096 A | * | 12/1944 | Platt | B64C 27/82 244/17.19 |
| 2,466,821 A | * | 4/1949 | Owen | B64C 27/10 244/17.17 |
| 2,609,053 A | * | 9/1952 | Lee | B64C 27/82 415/121.3 |
| 3,669,564 A | * | 6/1972 | Garfinkle | B64C 27/12 416/121 |
| 5,240,205 A | * | 8/1993 | Allongue | B64C 27/82 244/17.19 |
| 8,357,023 B2 | * | 1/2013 | Van de Rostyne | A63H 27/12 244/17.11 |
| 9,616,994 B2 | * | 4/2017 | Kereth | B64C 27/10 |
| 2017/0320564 A1 | * | 11/2017 | Kuzikov | F03D 3/062 |

* cited by examiner

*Primary Examiner* — Valentina Xavier
(74) *Attorney, Agent, or Firm* — LeopardPatel PC

(57) ABSTRACT

An aircraft that includes torque rotor and a lifting rotor, and generates torque from the torque rotor. The torque rotor may optimize drag production while the lifting rotor may optimize lift production limiting compromise between drag and lift production rotor.

22 Claims, 4 Drawing Sheets

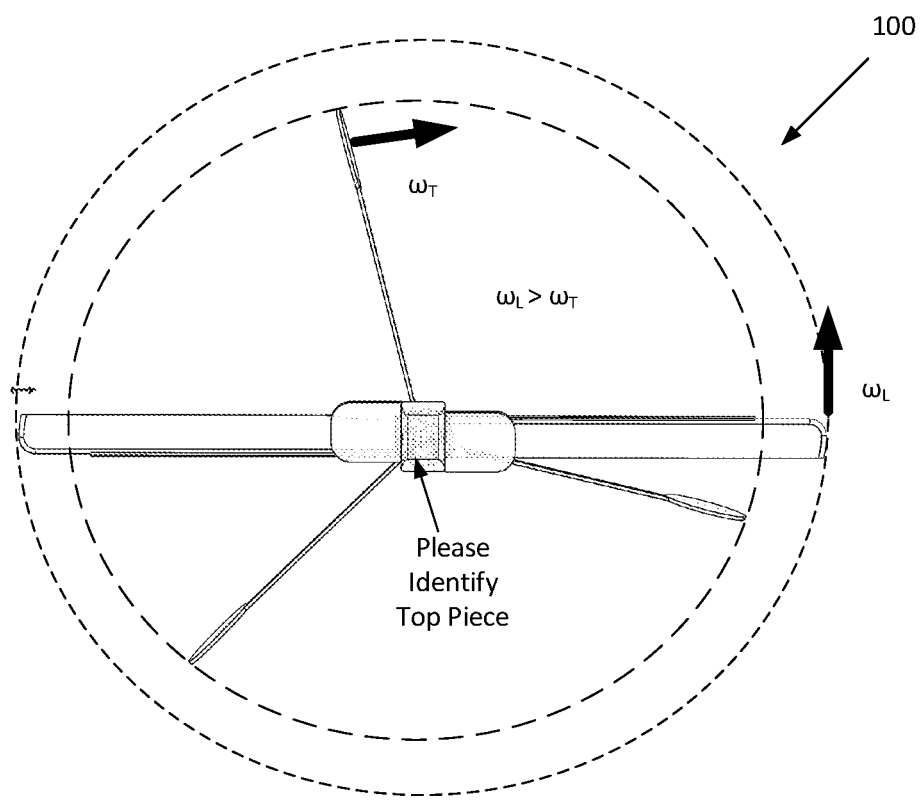

COUNTER ROTATING TORQUE DRIVE FOR ROTARY WING VEHICLE PROPULSION

FIELD

The present invention relates to an aerial vehicle (or aircraft), and more particularly, to generating torque for the aircraft.

BACKGROUND

Typical aircrafts, such as rotorcrafts, address torque imbalance from the main rotor by use of a tail rotor, counter rotating main rotors, or quad rotors with paired counter spun rotors. These approaches, however, suffer from high mechanical complexity and/or performance limitations in rarified atmosphere.

Further, in a low Reynolds number environment (e.g., Mars and other Low-density environments), the propeller may become much less efficient. In addition, an aircraft with a smaller characteristic length (very small size) will operate at a low Reynolds number and may also be less feasible.

In traditional counter rotating helicopter configurations, the upper and lower rotor operate at the same rotation rate in opposite directions (except when a yaw maneuver is performed). The reason for this is the fact that ½ of the lift is produced by each rotor. The present art decouples the lift production by generating lift with the lift rotor and generating torque with the torque rotor. This allows for large differences in rotation rate occurring between the two rotors, including a complete stop of the torque rotor to perform landing operations and scanning for image capture. When the torque rotor is temporarily stopped or scanning lift is generated from the rotational energy stored in the lift rotor, which may have greater inertia and stored angular momentum.

There is also a practical limit on the spin rate, which limits Earth-based forward speed and high-altitude flight. For example, in a tip driven rotorcraft the tip-jet spins at the rate of the rotor and is displaced from the CG, and therefore, experiences high-centripetal-G loading which causes bearings to stick and increases friction and leads to bearing failure.

Thus, an alternative approach for producing torque may be beneficial.

SUMMARY

Certain embodiments of the present invention may provide solutions to the problems and needs in the art that have not yet been fully identified, appreciated, or solved by current aircraft torque generating systems. For example, certain embodiments of the present invention generally pertain to an aircraft that generates torque from a torque rotor. The torque rotor may optimize drag production while a lifting rotor may optimize lift production.

In an embodiment, an apparatus for generating torque may include a motor coupling a lifting rotor and a torque rotor. The motor may spin the lifting rotor in a first direction to generate lift for the apparatus and spin the torque rotor in a second direction to generate drag-torque for the apparatus. The spinning of the torque rotor in the second direction is opposite to that of the spinning of the lifting rotor in the first direction.

An aircraft for generating torque may include one or more motors coupling one or more lifting rotors and one or more torque rotors. The one or more motors may spin the one or more lifting rotors in a first direction to generate lift for the aircraft and spin the one or more torque rotors in a second direction to generate drag-torque for the aircraft. The one or more torque rotors may spin in a second direction, which is opposite the first direction.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1C is a top view illustrating the aircraft, according to an embodiment of the present invention.

DETAILED DESCRIPTION OF THE EMBODIMENTS

Some embodiments generally pertain to an aircraft that includes a one or more torque (or spinning) rotors and one or more lifting rotors. In some embodiments, the one or more torque rotors may spin counter to that of the lifting rotor. Further, the one or more torque rotors may include one or more counter-spun paddles and/or variable pitch blades mounted at the center of gravity of the lifting rotor. In some embodiments, the one or more counter-spun paddles or blades may be located away from the center of gravity. The lifting rotor may include a single wing traversing across the center of the aircraft or a pair of wings connecting to a motor at the center of the aircraft. For example, the wings are single blade in some embodiments or are multi-blade in other embodiments.

The one or more torque rotors may be driven by a motor, which is at the aircraft's center of rotation in some embodiments. However, the motor may be offset from the aircraft's center of rotation in other embodiments. The one or more torque rotors may spin producing a drag force that provides a counter torque. The counter torque may drive the rotation of the main lifting surfaces.

The one or more torque rotors spin in a direction counter to that of the lifting rotor and the spin rates of the one or more torque rotor and lifting rotor may be different. For example, the one or more torque rotors may be temporarily de-spun for landing purposes or for image capturing purposes. While temporarily de-spun, the aircraft maintains stable flight using the stored angular momentum of the lifting rotor.

Figure 1A:
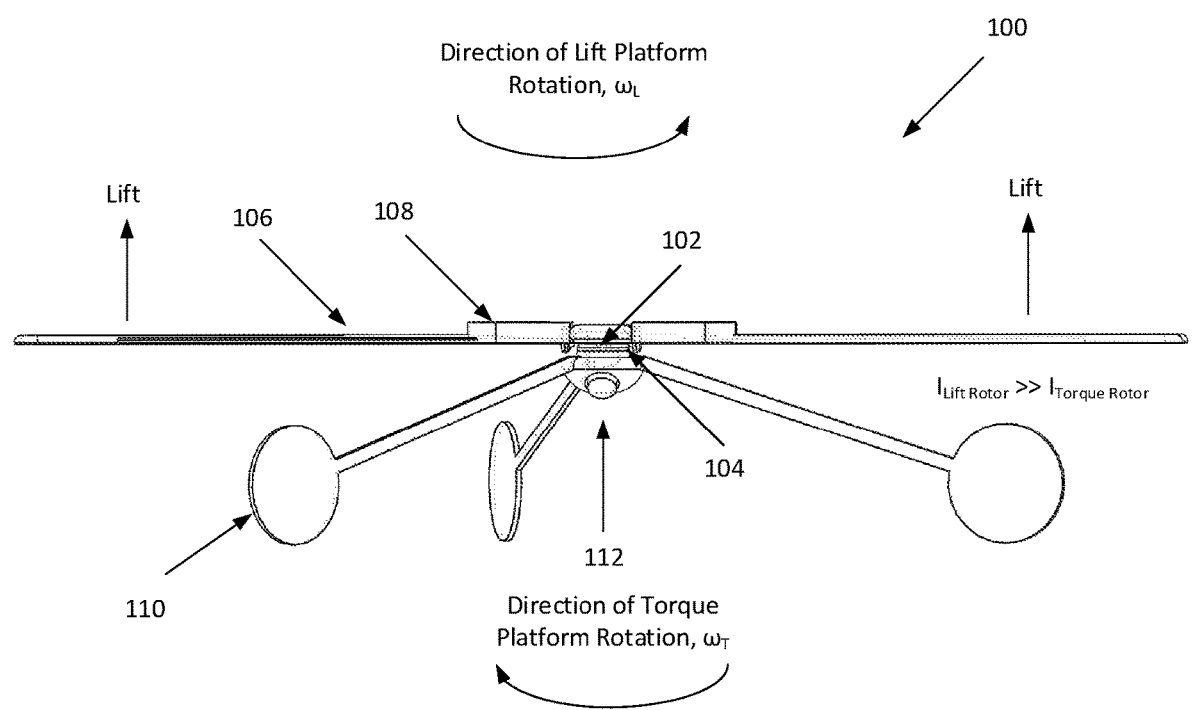
FIG. 1A is a front view illustrating an aircraft, according to an embodiment of the present invention.
Figure 1B:
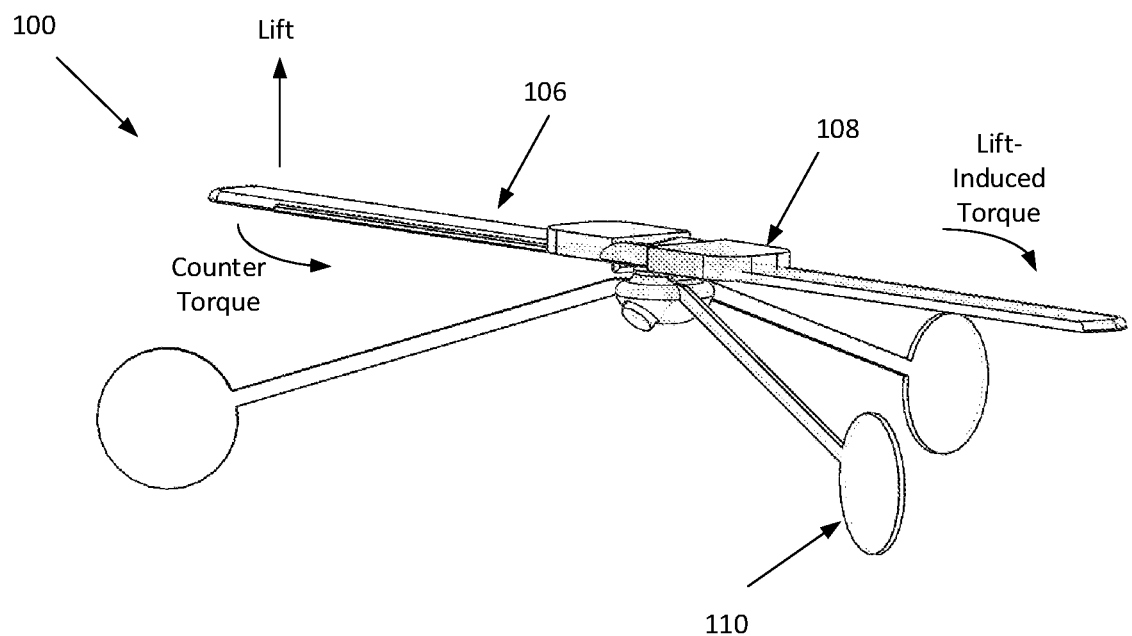
FIG. 1B is a prospective view illustrating the aircraft, according to an embodiment of the present invention.

FIGS. 1A-C illustrate an aircraft 100, according to an embodiment of the present invention. To seek out drag as a means of producing torque to drive aircraft 100, lifting rotor 106 and a torque rotor 110 are coupled by way of motor 102 and a shaft 104. Motor 102 in some embodiments may be a direct current (DC) electric motor or any type of motor that will drive torque rotor 110. In some embodiments, aircraft 100 may include an engine in place of, or in addition to, motor 102. In this embodiment, shaft 104 is part of motor 102, which may be broken into two components—rotor and stator.

Although torque rotor 110 in FIGS. 1A-C is located beneath lifting rotor 106, in other embodiments (not shown herein), torque rotor 110 may be above lifting rotor. In those embodiments, the placement of the payload above the lifting rotor may provide visibility above the horizon, which may be advantageous to some applications.

In certain embodiments, aircraft 100 may include multiple torque rotors, e.g., a first torque rotor above lifting rotor and a second torque rotor below the lifting rotor. In those embodiments, a similar benefit may be realized as discussed immediately above.

Further, although torque rotor 110 and lifting rotor 106 are on the same axis, i.e., appear to be co-aligned, in other embodiments, the axis of torque rotor 110 may be offset to that of the axis of lifting rotor 106. Such a configuration may be optimal for certain application and may be dependent upon use of aircraft 100.

Aircraft 100 may also include an avionics and power module 108 to control motor 102, as well as other components such as sensor 112.

In some embodiments, torque rotor 110 may spin at a slower rate than lifting rotor 106. Lifting rotor 106 may have more mass and a higher moment of inertia than that of torque rotor 110. This may allow aircraft 100 to temporarily maintain hovering flight without torque input from torque rotor 110. This embodiment may also allow for collection of data using torque rotor 110 as an inertially fixed or scanning frame of reference.

Lifting rotor 106 may store kinetic energy in some embodiments. In such an embodiment, the stored energy may be used for maintaining flight for aircraft 100 during imaging, when torque rotor 110 is de-spun, or is otherwise, stopped. For example, by using motor 102 to couple lifting rotor 106 and torque rotor 110, energy from torque rotor 110, and more specifically, energy from the stored angular momentum can be extracted while torque rotor 110 is temporarily slowed and stopped. Lifting rotor 106 may maintain lift by increasing the collective pitch angle and provides more lift allowing aircraft 100 to hover temporarily.

As shown in FIG. 1A, for this embodiment, the moment of inertia I for lifting rotor 106 is much greater than the moment of inertia I for torque rotor 110. Because torque rotor 110 has a lower moment of inert I, torque rotor 110 can be despun with minimal decrease to the spin rate of the lifting rotor 106. The greater drag of the torque rotor achieves equivalent torque to the lift rotor while spinning at a slower rate. This allows for snap imaging from the slower spinning torque rotor imager while aircraft 100 in-flight. This also solves the problem of high altitude flight and a low Reynolds number environment or configuration.

However, depending on the alignment and arrangement of lifting rotor 106 and torque rotor 110, the moment of inertia for lifting rotor 106 and moment of inertia for torque rotor 110 may be same or different.

As shown in FIG. 1C, the drag torque of lifting rotor 106 is offset by the drag torque of torque rotor 110 while in steady state flight. For example, lifting rotor 106 may spin at the same rate as torque rotor 110 producing a different amount of torque for the case shown. The torque generated by lifting rotor 106 is equal to the torque generated by torque rotor 110 even though $\omega_L > \omega_T$.

By temporarily de-spinning torque rotor 110, imaging can be performed by sensor 112. This can be accomplished through attitude estimation by sensor 112 and actuation of motor 104 to maintain alignment for target tracking applications. For this embodiment, continuous stop-motion imaging is enhanced with placement of sensor 112 on slower moving torque rotor 110.

In some embodiments, while lifting rotor 106 and torque rotor 110 are mechanically coupled by way of motor 102, motor 102 may reverse, reduce, or eliminate the driving torque allowing torque rotor 110 to be decoupled, de-spun, or reverse spun. Rather than having torque rotor 110 produce both lift and torque, torque rotor 110 is simply producing torque. This way, by intentionally producing drag, the amount of torque necessary to fly in low density environments can be realized.

It should be noted that when aircraft 100 is on the ground, i.e., prior to flight, and regardless of the location of lifting rotor 106, motor 102 may cause lifting rotor 106 to spin. The spinning of lifting rotor 106 may generate lift for aircraft 100. Immediately thereafter, motor 102 may cause torque rotor 110 to spin. The spinning of torque rotor 110 may produce drag, generating the necessary torque to keep lifting rotor 106 in-flight.

Depending on the length of moment arm of torque rotor 110 measured from, in some embodiments, the center of the axis of rotation of aircraft 100, the rate at which torque rotor 110 spins may be increased or decreased. For example, to achieve a high spin rate, the length of torque rotor 110 is much shorter. Conversely, to achieve a slower spin rate, the length of torque rotor 110 is much longer. Additionally, a fixed moment arm with varying torque paddle area can achieve the same result. The length of torque rotor 110 may be more of a design choice depending on the application of aircraft 100.

When aircraft 100 is in a low-density altitude, the damping from aerodynamics is lower, i.e., things may not slow down as quickly. During this type of flight regime, coaxial helicopters get different loading on the upper and lower rotor potentially causing both to collide with each. This collision may damage the aircraft. To avoid this issue, lifting rotor 106 and torque rotor 110 are configured to address two different functions (e.g., creating lift and generating torque, respectively), preventing the two rotors from colliding.

As is known, the separation distance for standard coaxial helicopters is limited by the blade flap angle required to prevent collision. This separation distance limits the height of the overall vehicle. This limitation on height is not present in the embodiments of aircraft 100 as torque rotor 110 does not have a high blade flap angle, since lifting rotor 106 only produces lift.

In some further embodiments, the spin axis of torque rotor 110 is in parallel with the axis of rotation of the lifting rotor.

In certain embodiments, lifting rotor 106 airfoil or blade angles are variable by way of pitch control, which can be implemented in many ways. Some implementations may include flaps, servos, wing warping, etc., as well as other standard aircraft control methods.

Figure 1D:
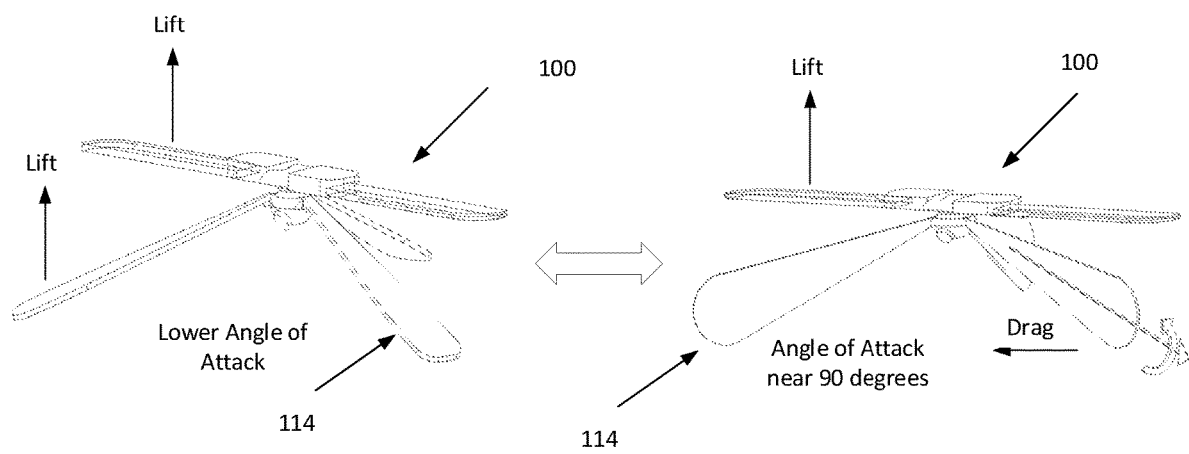
FIG. 1D shows prospective views illustrating an aircraft with variable pitch torque rotors, according to an embodiment of the present invention.

FIG. 1D shows prospective views illustrating aircraft 100 with variable pitch blades 114, according to an embodiment of the present invention. In this embodiment, the drag paddles are replaced by variable pitch blades 114, and are configured to rotate an angle of attack to provide lift as well as drag. For example, each variable pitch blade 114 can be rotated to an angle of attack to 90 degrees to generate torque at a slower, lower rotation rate or rotated to a lower angle of attack to generate efficient lift. To change the angle of attack, a servo may be used. However, one of ordinary skill in the art would appreciate that any type of device or method to change the angle may be used.

As discussed above, typical aircraft, such as the rotorcraft, address torque imbalance from the main rotor by use of a tail rotor, counter rotating main rotors, or quad rotors with paired counter spun rotors. These approaches, however, suffer from high mechanical complexity and/or performance limitations in rarified atmosphere.

Further, in a low Reynolds number environment (e.g., Mars, high-altitude low density, or low altitude with a short characteristic length (chord)), the motor propeller may become much less efficient. In addition, the higher altitude/low density may require higher spin rates resulting in unacceptable lateral G-forces being present on the off-set motor, causing friction and rapid failure. This is a limiting condition for tip driven rotors.

Some embodiments described herein solve these problems by generating efficient torque via a counter rotating torque rotor, eliminating the need for a tip-mounted motor to drive the rotation of the main rotor. The counter rotating torque rotor may produce drag forces that provide the counter torque. The counter rotating torque may drive the rotation of the lifting rotor in some embodiments, and reduce the overall mechanical complexity of the aircraft. This reduction in complexity allows for a scaling down of the aircraft, which is otherwise not possible.

The counter rotating torque rotor enables more efficient torque generation at a Low Reynolds number operating condition where traditional propellers lack efficiency. The G-loading present on the off-set motors generally limit rotation rates, and thus, limits high altitude performance. With the center mounted counter torque drive, G-loading is no longer the limiting factor in torque production. In certain embodiments, the lift force generated by the lifting rotor and the driving force generated by drag from the counter rotating torque rotor. This may result in faster forward flight and higher altitude flight. The counter spinning torque rotor may be used as landing gear, temporary de-spun rotor for slew/image capture, and torque production to drive the lifting rotor.

By using the counter rotating torque rotor, the following advantages may be realized: (1) spin stabilize the aircraft, (2) powered ascent, (3) passively stable unpowered descent, (4) small size and lightweight, (5) less mechanical complexity compared to other rotorcrafts, (6) single motor used for driving the main rotor, and countering lift induced drag torque, (7) reduces losses from geared transmissions, (8) safe recovery to ground with power loss, (9) extended loiter at a desired altitude, (10) higher-altitude/low density operations, (11) efficient lift production, (12) spinning base rotors can be stopped to enable temporary fixed pointing and imaging, (13) rotating rotor performs dual functions of producing torque to drive lifting rotor and provide a wide landing base when de-spun, (14) no rotation rate limitation due to G-loading on the tip-mounted motor propeller drive, and (15) counter rotating torque rotor can rotate at a much slower rate compared to the lifting rotor allowing improved image capture as compared to the all-rotating rotorcraft.

The counter rotating torque rotor may also be used by hurricane chasers, in a wind shear at airports to ward off landing or takeoff if a dangerous wind gust moves onto the runway, and Mars atmospheric flight, for example. The reduced size enabled by the mechanical simplicity and high torque generation in the low-Reynolds number regime allows for the creation of micro-scaled aircraft.

It will be readily understood that the components of various embodiments of the present invention, as generally described and illustrated in the FIGURES herein, may be arranged and designed in a wide variety of different configurations. Thus, the detailed description of the embodiments, as represented in the attached FIGURES, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for generating torque, comprising:
a motor coupling a lifting rotor and a torque rotor, and configured to spin the lifting rotor in a first direction to generate lift for the apparatus and spin the torque rotor in a second direction generate drag-torque for the apparatus, wherein
the spinning of the torque rotor in the second direction is opposite to that of the spinning of the lifting rotor in the first direction, and the torque rotor and the lifting rotor are decoupled from one another.

2. The apparatus of claim 1, wherein a rotation rate of the lifting rotor is different than a rotation rate of the torque rotor due to drag generated by the spinning of the torque rotor.

3. The apparatus of claim 2, wherein a moment of inertia for the lifting rotor is different from a moment of inertia for the torque rotor.

4. The apparatus of claim 1, wherein the torque rotor is located above or below, the lifting rotor.

5. The apparatus of claim 1, wherein the torque rotor has a parallel spin axis to that of, and is co-aligned or offset from, the lifting rotor.

6. The apparatus of claim 1, wherein the motor is configured to temporarily de-spin the torque rotor, allowing the apparatus to land or hover.

7. The apparatus of claim 1, wherein the lifting rotor has more mass and a higher moment of inertia than that of the torque rotor, allowing the apparatus to maintain flight without input from the torque rotor.

8. The apparatus of claim 1, wherein the lifting rotor is configured to store kinetic energy from the torque rotor, allowing the apparatus to maintain flight when the torque rotor is temporarily de-spun or is stopped.

9. The apparatus of claim 1, wherein the spin rate of the torque rotor is dependent both upon a length of moment arm of the torque rotor measured from a center axis of rotation of the apparatus and the drag produced by the torque rotor.

10. The apparatus of claim 1, further comprising:
a plurality of variable pitch blades configured to rotate an angle of attack, providing lift as well as drag, wherein each of the plurality of variable pitch blades are rotated to the angle of attack of up to 90 degrees or rotated to a lower angle of attack.

11. An aircraft, comprising:
one or more motors coupling one or more lifting rotors and one or more torque rotors, and configured to spin the one or more lifting rotors in a first direction to generate lift for the aircraft and spin the one or more torque rotors in a second direction to generate drag-torque for the aircraft, wherein
the one or more motors decouples the one or more torque rotors and the one or more lifting rotors from one another by reducing or eliminating the driving torque allowing the one or more torque rotors to be de-spun.

12. The aircraft of claim 11, wherein a rotation rate of the one or more lifting rotor to be different than of a rotation rate of the one or more torque rotors due to drag generated by the spinning of the one or more torque rotors.

13. The aircraft of claim 12, wherein a moment of inertia for the one or more lifting rotor is different from a moment of inertia for the one or more torque rotors.

14. The aircraft of claim 11, wherein the one or more torque rotors are located above, below, or above and below the one or more lifting rotor.

15. The aircraft of claim 11, wherein the one or more torque rotors and the one or more lifting rotor are decoupled from one another.

16. The aircraft of claim 11, wherein the one or more torque rotors have a parallel spin axis to that of, and are co-aligned or offset from, the one or more lifting rotor.

17. The aircraft of claim 11, wherein, when the one or more motors temporarily de-spins the one or more torque rotors, the aircraft can land or hover.

18. The aircraft of claim 11, wherein the one or more lifting rotor has more mass and a higher moment of inertia than that of the one or more torque rotors, allowing the aircraft maintain flight without input from the one or more torque rotors.

19. The aircraft of claim 11, wherein the one or more lifting rotor is configured to store kinetic energy from the one or more torque rotors, allowing the aircraft to maintain flight when the one or more torque rotors are temporarily de-spun or is stopped.

20. The aircraft of claim 11, wherein the spinning of the one or more torque rotors are dependent upon a length of moment arm of the one or more torque rotors measured from a center axis of rotation of the aircraft.

21. The aircraft of claim 11, wherein the one or more torque rotors comprise
one or more counter-spun paddles mounted at the center of gravity of the one or more lifting rotor or located away from the center of gravity.

22. The apparatus of claim 11, further comprising:
a plurality of variable pitch blades configured to rotate an angle of attack, providing lift as well as drag, wherein each of the plurality of variable pitch blades are rotated to the angle of attack of up to 90 degrees or rotated to a lower angle of attack.

* * * * *